United States Patent
Wegner et al.

(10) Patent No.: US 8,459,961 B2
(45) Date of Patent: Jun. 11, 2013

(54) MULTISTAGE COMPRESSOR UNIT WITH COOLING DEVICE

(75) Inventors: Jürgen Wegner, Eislingen (DE); Joachim Huster, Berg (DE)

(73) Assignee: Behr GmbH & Co. KG, Stuttgart (DE)

( * ) Notice: Subject to any disclaimer, the term of this patent is extended or adjusted under 35 U.S.C. 154(b) by 1020 days.

(21) Appl. No.: 12/125,232

(22) Filed: May 22, 2008

(65) Prior Publication Data
US 2009/0004029 A1 Jan. 1, 2009

(30) Foreign Application Priority Data
May 24, 2007 (DE) .......................... 10 2007 024 633

(51) Int. Cl.
*F04B 23/00* (2006.01)

(52) U.S. Cl.
USPC ............................................ 417/243; 60/599

(58) Field of Classification Search
USPC ................. 417/243, 364; 60/599; 123/559.1, 123/563
See application file for complete search history.

(56) References Cited

U.S. PATENT DOCUMENTS

| | | | |
|---|---|---|---|
| 2,612,310 A | 9/1952 | Eggmann | |
| 3,977,195 A | 8/1976 | Treuil | |
| 4,125,345 A * | 11/1978 | Yoshinaga et al. ............ | 417/243 |
| 4,697,423 A | 10/1987 | Conrad et al. | |
| 5,795,138 A | 8/1998 | Gozdawa | |
| 6,050,780 A * | 4/2000 | Hasegawa et al. ......... | 417/44.11 |
| 6,398,517 B1 | 6/2002 | Choi | |
| 7,278,472 B2 * | 10/2007 | Meshenky et al. ............. | 165/125 |
| 2004/0055740 A1 * | 3/2004 | Meshenky et al. ............. | 165/125 |
| 2004/0107948 A1 * | 6/2004 | Meshenky et al. .......... | 123/559.1 |
| 2004/0118389 A1 * | 6/2004 | Shaffer et al. ................. | 123/563 |
| 2006/0081225 A1 * | 4/2006 | Yi ................................. | 123/563 |

FOREIGN PATENT DOCUMENTS

| | | |
|---|---|---|
| DE | 1093040 B | 11/1960 |
| DE | 2420308 A1 | 11/1975 |
| DE | 100 01 063 A1 | 7/2001 |
| DE | 10 2006 011 062 A1 | 9/2007 |
| EP | 1 505 274 A1 | 2/2005 |
| EP | 1505274 A1 | 2/2005 |
| GB | 2069593 A | 8/1981 |

OTHER PUBLICATIONS

European Extended Search Report for Application No. 08009352.9-1267 dated Apr. 27, 2011.

* cited by examiner

*Primary Examiner* — Charles Freay
*Assistant Examiner* — Christopher Bobish
(74) *Attorney, Agent, or Firm* — Bachman & LaPointe, P.C.

(57) ABSTRACT

A multistage compressor unit consisting of a low-pressure charging device having a low-pressure compressor housing, a high-pressure charging device having a high-pressure compressor housing and a cooling device, characterised in that the cooling device comprises a cooling device housing and the cooling device housing of the cooling device is indirectly connected to the low-pressure compressor housing of the low-pressure charging device and the high-pressure compressor housing of the high-pressure charging device.

13 Claims, 3 Drawing Sheets

MULTISTAGE COMPRESSOR UNIT WITH COOLING DEVICE

BACKGROUND OF THE INVENTION

The present invention relates to a multistage compressor unit with a cooling device as used, for example, in motor vehicles.

From the state of the art it is known that the power of an internal combustion engine can be increased when a turbosupercharger is additionally employed. If the air charge for the internal combustion engine is compressed in the combustion chamber prior to ignition the internal power of the internal combustion engine is increased due to higher throughput of air and fuel per working cycle. By compressing a volume of air its temperature rises while the density of the compressed air decreases. Using an air charge treated in this way the power increase due to the compressed air charge is still low. For this reason it is necessary for the compressed air charge to be cooled down before entering the combustion chamber. This is usually done with the aid of an air charge cooler. In multistage compression of the air charge an intermediate cooler is arranged between a low-pressure compressor and a high-pressure compressor.

The intermediate coolers hitherto employed are of very large construction. Since in these the inlets and outlets on the compressor housing are spaced quite far apart costly connecting elements each having a long line path are used for the intermediate cooler arranged in between.

EP 1 505 274 A1 discloses an intermediate cooler for a two-stage exhaust turbosupercharger consisting of a low-pressure and a high-pressure compressor. The air charge cooler comprises a connecting channel carrying the air charge which connects the two compressors to one another and has an internal cooling insert. The intermediate cooler is connected to the engine via connecting elements. Feed and discharge openings of the flow openings are constructed in the connecting channel and connected to an air-conditioning system in the vehicle.

SUMMARY OF THE INVENTION

The present invention sets itself the task of providing an improved multistage compressor unit with a cooling device.

This task is solved according to the invention by a multistage compressor unit with cooling device as described herein.

A compressor unit with cooling device according to the invention that can be used in particular in motor vehicles consists of a low-pressure charging device having a low-pressure compressor housing, a high-pressure charging device having a high-pressure compressor housing and a cooling device. The cooling device comprises a cooling device housing that is indirectly connected to the low-pressure compressor housing of the low-pressure charging device and the high-pressure compressor housing of the high-pressure charging device.

Advantageously the required installation space for the compressors and the cooling device is reduced on account of the compact arrangement of the cooling device and compressors according to the invention by comparison with an arrangement according to the state of the art.

Another advantage of a cooling device according to the invention may consist in that the latter can advantageously easily be exchanged or be dismantled and installed for repairs on account of the indirect connections to the interfaces to the compressors.

The cooling device for the multistage compressor unit according to the invention advantageously comprises flow channels for a coolant.

A flow channel in the cooling device has a longitudinal direction which preferably is identical to the main flow direction of the air passing through. The flow channel is preferably constructed in the shape of a substantially circular cross-section, but other cross-sectional shapes diverging from this are also possible. The longitudinal axis of the flow channel may run in a straight line or a curve.

In the low-pressure compressor housing flow channels are advantageously constructed as feed/discharge channels for the coolant. Advantageously these may alternatively or additionally be constructed in the high-pressure compressor housing. Their cross-section is preferably constructed in the shape of a substantially circular cross-section, but other cross-sectional shapes diverging from this are also possible. These flow channels can advantageously be connected to a coolant circuit of an air-conditioning system. Thus, the connectors for the coolant lines from an air-conditioning system to the flow channels in a compressor housing can be of more stable construction.

In one embodiment the cooling device can be integrated or accommodated in one or both compressor housings, the compressor housing extending from an inlet or outlet in a longitudinal direction in such a way that the cooling device can be accommodated therein.

The cooling device is preferably a shell-and-tube cooler since due to its compact structure along its longitudinal direction it has a high volume power density for the heat to be carried off. However, other heat exchangers having a compact structure are also possible.

In an advantageous embodiment of the multistage compressor unit according to the invention at least one compressor housing of the pressure charging device comprises a flange, wherein compressed air and at least one stream of coolant flows through the cross-section of the flange. A corresponding flange on the cooling device can preferably be bolted, engaged, adhesively bonded and/or welded to the flange of the compressor housing, but other customary fastening means according to the state of the art may also be employed.

In a preferred version a joint is constructed between an outlet or inlet of a pressure charging device and an inlet or outlet of the cooling device as a connecting part, wherein a first side of the connecting part substantially corresponds in cross-section to the inlet or outlet of a pressure charging device and a second side of the connecting part substantially corresponds in cross-section to the inlet or outlet of the cooling device. The cross-section of the first side and the cross-section of the second side of the connecting part are usually different. The first cross-section preferably has the shape of a circle. The second cross-section has the shape of an inlet for the cooling device which is preferably rectangular or square.

Preferably the cross-sections of the flow channels for the coolant exhibit inlet/outlet cross-sections in a compressor housing which can be arranged substantially in a plane. The flow channels for the coolant in the compressor housings are moreover preferably arranged beside one another as a result of which advantageously a compact arrangement of the flow channels for the compressor housing results.

Advantageously, on account of the indirect fastening of the cooling device between the compressor housings fastening elements are not necessary. The elimination of the hitherto required fastening elements for the cooling device on the engine advantageously ensures a reduction in the weight of the multistage compressor unit and increases flexibility with regard to the arrangement of the cooling device in the region of the engine.

Preferably at least one flow channel is arranged inside the cooling device housing and at least one other flow channel outside the cooling device housing. Advantageously the coolant flowing out of the cooling device and heated by the air charge is carried off in a flow channel arranged outside the cooling device housing. Thus, the coolant carried off outside the cooling device housing can advantageously on the way to the air-conditioning system give off some of its heat via the flow channels to the surroundings and does not heat the air charge.

Advantageously a low-loss air charge conduit may result in the connecting regions between the cooling device and the compressors because, on the one hand, the air charge need only travel a short way in the connecting regions and, on the other hand, the air charge need not be diverted in the connecting regions since the air charge emerges from an exit cross-section in the main flow direction of the air charge.

Connecting regions of short construction between the cooling device and the compressors with correspondingly small air charge volumes are particularly advantageous with regard to noise production in the cooling device since the resonant frequencies of the air charge volume in the connecting regions are advantageously shifted due to the short spacing between the cooling device and the compressor. Due to connecting regions of short construction a lower pressure loss can also advantageously be achieved on the air charge side and hence the power of the compressor unit increased.

From small air charge volumes in said connecting regions there further results a shortened response time from the engine to a desired increase in speed by the driver. The additional engine power can then be provided more rapidly.

BRIEF DESCRIPTION OF THE DRAWINGS

Other advantages, characteristics and possible applications of the present invention emerge from the following description in association with the figures. These show in partially schematic form.

DETAILED DESCRIPTION

Figure 1:
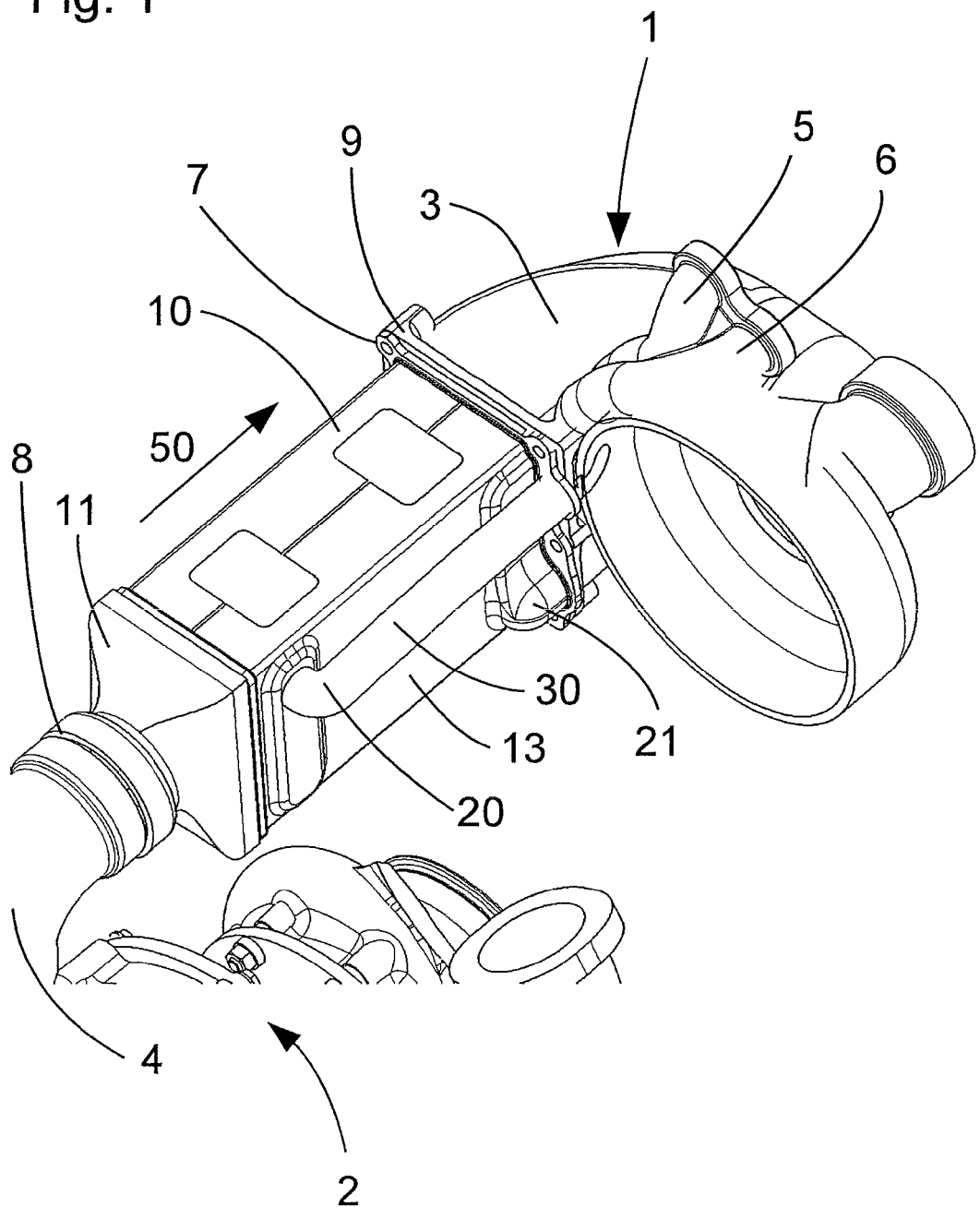
FIG. 1 a view in perspective of a multistage compressor having an intermediate cooler according to a version of the present invention.
Figure 3:
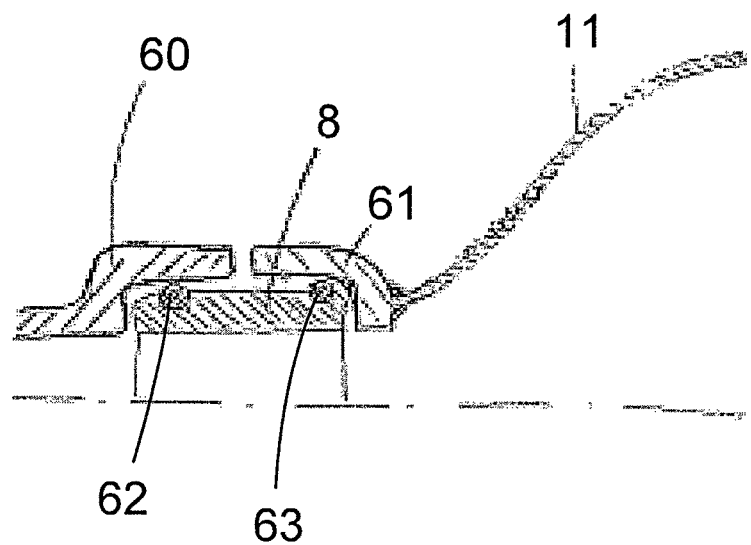
FIG. 3 a view in section of a coupler connection from the side.

FIG. 1 shows a view in perspective of a multistage compressor unit with an intermediate cooler 10 according to a preferred embodiment of the present invention. The multistage compressor unit comprises a low-pressure compressor 2 having a low-pressure compressor housing 4 and a low-pressure compressor outlet extending into a channel in the main flow direction 50, an intermediate cooler 10 and a high-pressure compressor 1 having a high-pressure compressor housing 3. The low-pressure compressor housing 4 is joined via a connecting part in the form of a coupler 8 to a diffuser 11 of the intermediate cooler 10, wherein the coupler 8 is constructed as a one-piece component. A view of this coupler connection in section is shown in FIG. 3. The air charge emerging from the low-pressure compressor housing 4 is not diverted.

The intermediate cooler 10 is a shell-and-tube cooler which is simply traversed. The intermediate cooler 10 has an outlet having an associated intermediate cooler flange 7 which is bolted to a high-pressure compressor flange 9 at an inlet on the high-pressure compressor housing 3. In this embodiment the intermediate cooler flange 7 comprises a cross-section traversed by a coolant counter to the main flow direction 50 and another cross-section traversed by compressed air from the intermediate cooler 10 in the main flow direction 50. In a modification that is not shown the coolant and the compressed air can both be carried in the same stream in the main flow direction 50. The intermediate cooler 10 has a longitudinal axis which runs substantially in the outflow direction of the air charge from the low-pressure compressor housing 4.

The design of the intermediate cooler housing 13 is substantially rectangular. On one side of the intermediate cooler housing 13 a substantially cylindrical flow channel 30 with an outer wall extends from the intermediate cooler flange 7 into a region of the inlet of the intermediate cooler 10 counter to the main flow direction 50, wherein its longitudinal direction is substantially parallel to the main flow direction 50. In this embodiment the flow channel 30 runs outside the intermediate cooler housing 13. In a modification that is not shown the flow channel 30 may also run inside the intermediate cooler housing 13. On a side of the flow channel 30 opposite the intermediate cooler flange 7 a coolant inlet 20 extends at right angles to the main flow direction 50 of the air charge into the intermediate cooler 10. The coolant inlet 20 has a substantially circular cross-section. The coolant is fed via a coolant inlet 21 to the intermediate cooler 10 at a first temperature and during passage through the intermediate cooler 10 counter to the main flow direction 50 heats up to a second temperature which is higher than the first temperature. The coolant then emerges from the intermediate cooler 10 at the coolant outlet 20 and is carried back to the air-conditioning system via the flow channel 30.

Figure 2:
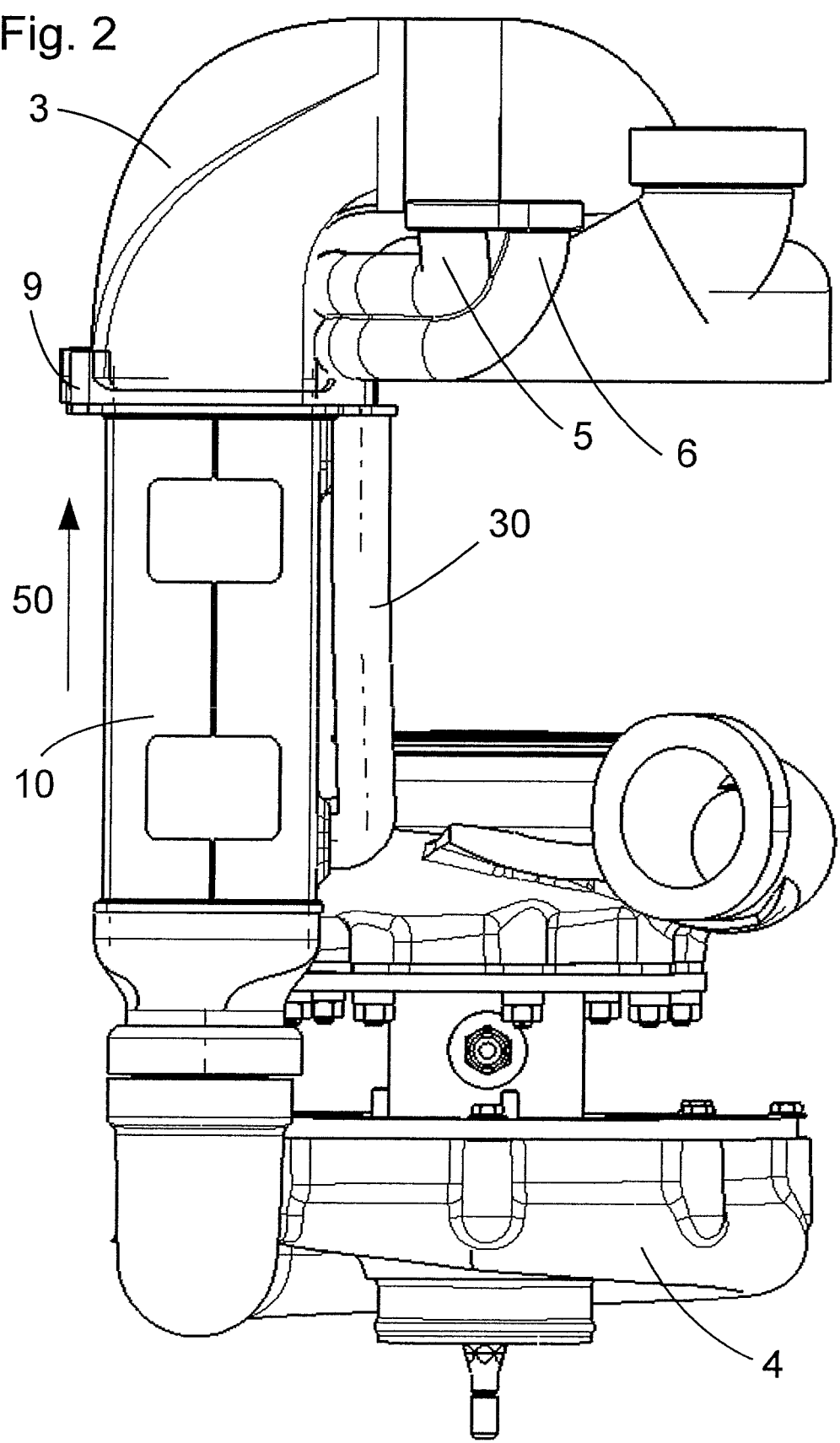
FIG. 2 a plan view of the multistage compressor with intermediate cooler as shown in FIG. 1.

FIG. 2 shows a plan view of the multistage compressor unit with intermediate cooler 10 according to FIG. 1. The high-pressure compressor housing 3 has on each side a flow channel for an inlet 5 and a flow channel for an outlet 6 for the coolant to the intermediate cooler 10. The cross-sections in the end region of the flow channels each run into the high-pressure compressor flange 9. The flow channels 5, 6 for the coolant supply are each constructed in the high-pressure compressor housing 3.

FIG. 3 shows in section a view from the side of the coupler connection between the low-pressure air charge cooler 2 and the intermediate cooler 10 according to FIG. 1. On one side the low-pressure compressor housing 4 has a connecting pipe 60 having a substantially circular cross-section. The internal diameter of the connecting pipe 60 is substantially identical to the external diameter of the coupler 8 so that the coupler 8 is fixed by friction in the connecting pipe 60. The diffuser 11 has on its side facing the intermediate cooler 10 an outlet cross-section that is substantially identical to the cross-section of the inlet of the intermediate cooler 10. In the region of a connecting pipe 61 for plug-in connection the diffuser 11 exhibits on its inside a diameter that is substantially identical to the external diameter of the coupler 8 so that the coupler 8 is fixed by friction in the connecting pipe 61. The flow channel for the compressed air charge is sealed with respect to the surroundings in the region of the coupler 8 in each case with a seal 62, 63 in the region of the respective connecting pipes 60, 61.

The invention claimed is:

1. Multistage compressor unit consisting of a low-pressure charging device (2) having a low-pressure compressor housing (4), a high-pressure charging device (1) having a high-pressure compressor housing (3) and a cooling device (10), characterised in that the cooling device (10) comprises a cooling device housing (13) and the cooling device housing (13) of the cooling device (10) is indirectly connected to the low-pressure compressor housing (4) of the low-pressure charging device (2) and the high-pressure compressor housing (3) of the high-pressure charging device (1), wherein at least one compressor housing (3, 4) of a pressure charging device (1, 2) comprises a flange (9) which defines passages for compressed air and at least one stream of coolant, wherein the passages for at least one stream of coolant pass through a cross section of the flange which extends outwardly from the at least one compressor housing (3, 4), and wherein a connection between an outlet or inlet of a pressure charging device (1, 2) and an inlet or outlet of the cooling device (10) is constructed as a flange connection (7), wherein a portion of the flange which extends outwardly from the at least one compressor housing (3, 4) defines the passages for the at least one stream of coolant.

2. Multistage compressor unit according to claim 1, wherein the cooling device (10) comprises flow channels for a coolant.

3. Multistage compressor unit according to claim 1, wherein in the low-pressure compressor housing (4) flow channels for coolant are constructed.

4. Multistage compressor unit according to claim 1, wherein in the high- pressure compressor housing (3) flow channels for coolant are constructed.

5. Multistage compressor unit consisting of a low-pressure charging device (2) having a low-pressure compressor housing (4), a high-pressure charging device (1) having a high-pressure compressor housing (3) and a cooling device (10), characterised in that the cooling device (10) comprises a cooling device housing (13) and the cooling device housing (13) of the cooling device (10) is indirectly connected to the low-pressure compressor housing (4) of the low-pressure charging device (2) and the high-pressure compressor housing (3) of the high-pressure charging device (1), wherein at least one flow channel extends along the cooling device in a main flow direction (50) of the cooling device (10) and is arranged inside the cooling device housing (13) and at least one other flow channel extends along the cooling device in a main flow direction (50) of the cooling device (10) and is arranged outside the cooling device housing (13) wherein the at least one flow channel and the at least one other flow channel extend from one end of the cooling device to the other end of the cooling device.

6. Multistage compressor unit according to claim 1, wherein a joint is constructed between an outlet or inlet of a pressure charging device (1, 2) and an inlet or outlet of the cooling device (10) as a connecting part (8), wherein a first side of the connecting part (8) substantially corresponds in cross-section to the inlet or outlet of a pressure charging device (1, 2) and a second side of the connecting part (8) substantially corresponds in cross-section to the inlet or outlet of the cooling device (10).

7. Multistage compressor unit corresponding to claim 1, wherein the cooling device (10) is connected to a coolant circuit of an air-conditioning system.

8. Multistage compressor unit according to claim 1, wherein the cooling device (10) comprises a shell-and-tube cooler.

9. Multistage compressor unit according to claim 1, wherein cross-sections for flow channels for coolant have inlet/outlet cross-sections in a compressor housing (3, 4) which are arranged substantially in a plane.

10. Multistage compressor unit according to claim 1, wherein flow channels for coolant are arranged in a compressor housing (3, 4) at least in part beside one another.

11. Multistage compressor unit according to claim 5, wherein at least one compressor housing (3, 4) of a pressure charging device (1, 2) comprises a flange (7) which defines passages for compressed air and at least one stream of coolant and wherein a connection between an outlet or inlet of a pressure charging device (1, 2) and an inlet or outlet of the cooling device (10) is constructed as a flange connection.

12. Multistage compressor unit according to claim 2, wherein the flow channels comprise feed and discharge channels for a coolant.

13. Multistage compressor unit according to claim 1, wherein compressed air does not undergo diversion in an outlet cross-section.

* * * * *